United States Patent [19]

Matthews

[11] 3,864,711
[45] Feb. 4, 1975

[54] CAMERA CARRYING CASE
[76] Inventor: Donald H. Matthews, Quaker Bottom Rd., Sparks, Md. 21152
[22] Filed: Jan. 24, 1974
[21] Appl. No.: 436,083

[52] U.S. Cl. ............................................. 354/354
[51] Int. Cl. .......................................... G03b 17/56
[58] Field of Search ....................... 354/354; 150/52

[56] References Cited
UNITED STATES PATENTS
| | | | |
|---|---|---|---|
| 1,220,957 | 3/1917 | Conway | 150/52 |
| 2,481,717 | 9/1949 | Blair | 354/293 |
| 2,482,248 | 9/1949 | Coon | 150/52 |
| 2,503,485 | 4/1950 | Hill | 150/52 |
| 2,547,492 | 4/1951 | Rohlik | 150/52 |

Primary Examiner—John M. Horan
Attorney, Agent, or Firm—John F. McClellan, Sr.

[57] ABSTRACT

A camera carrying case having a case body with selectively stiffened portions, a yielding lower portion, a forward opening, an upper opening for receiving a camera, and a hinged cover with an enclosure for carrying camera accessories, the whole being especially adapted for use with a camera design exemplified by the Polaroid Land SX70 camera and permitting all camera operations while the camera is within the carrying case, except film loading.

8 Claims, 9 Drawing Figures

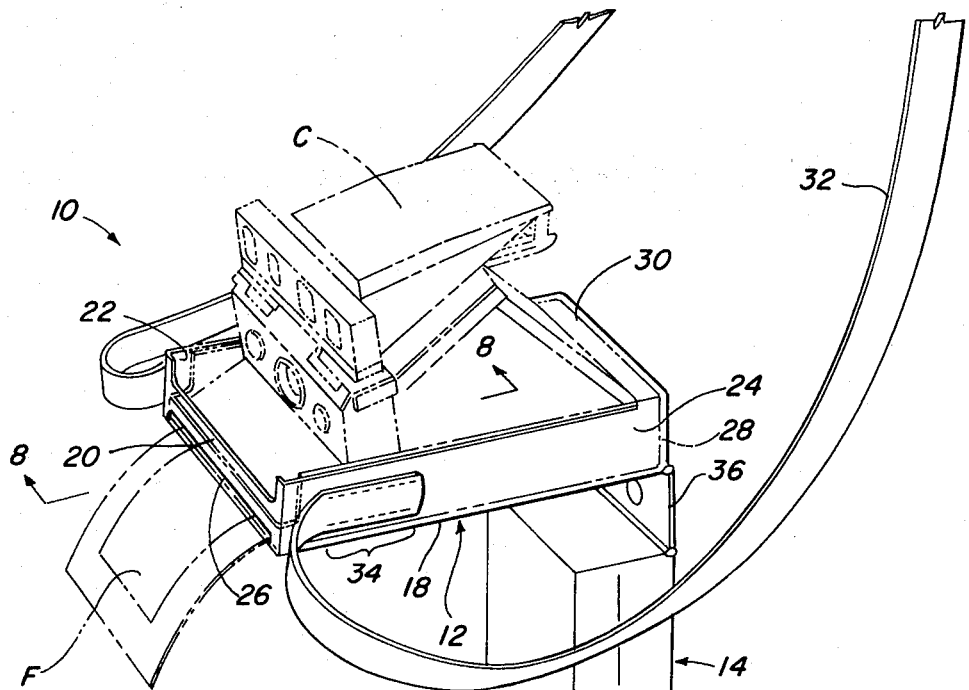
FIG.1
FIG.2
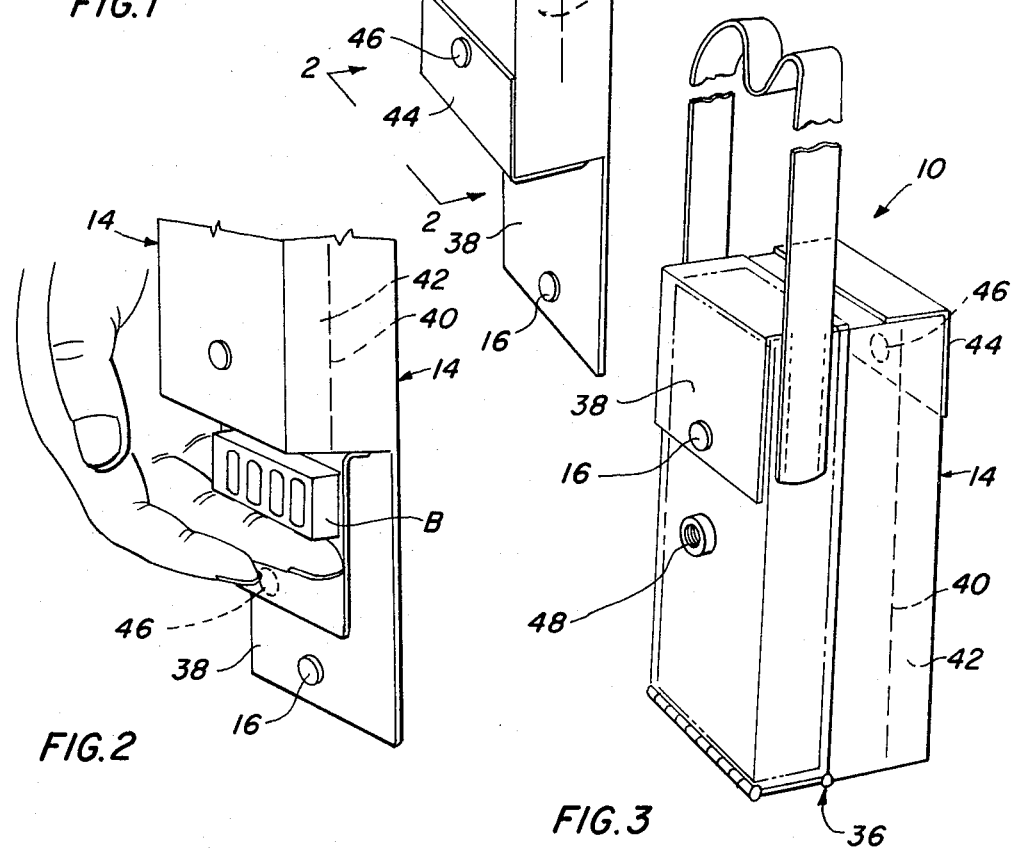
FIG.3

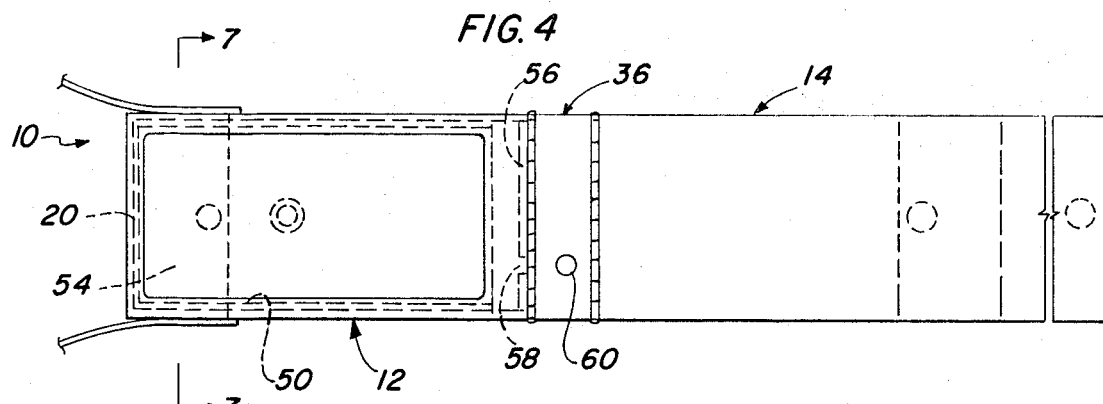
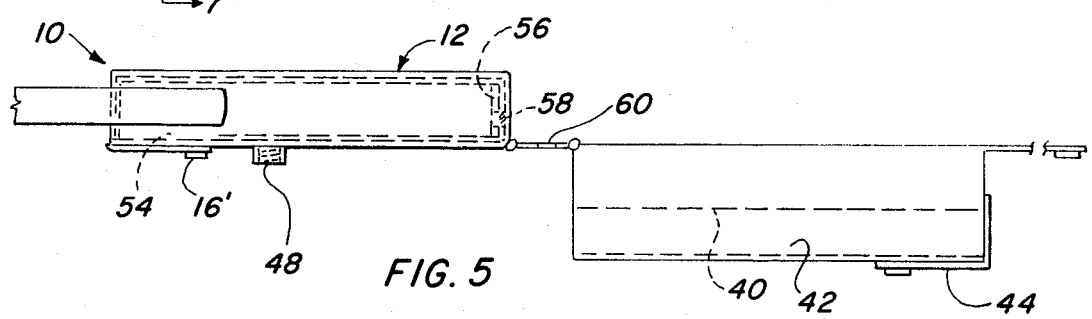
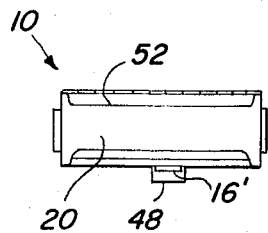
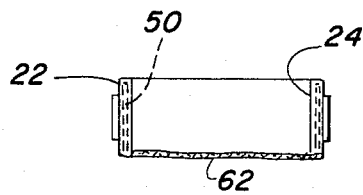
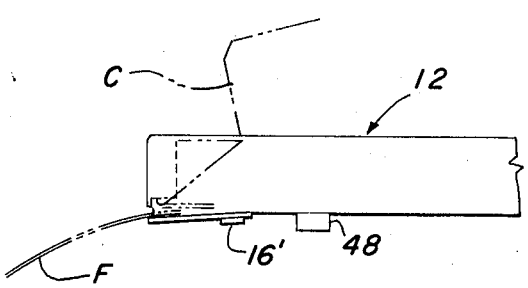
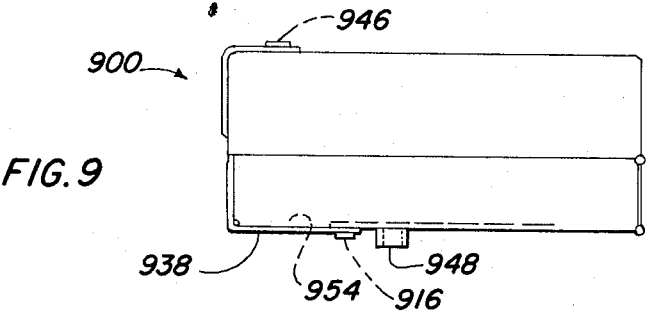

1

CAMERA CARRYING CASE

This invention relates generally to photographic equipment and specifically to camera carrying cases.

A principal object of this invention is to supply a carrying case for a camera design exemplified by one particular make and model of camera, although within the spirit of the invention similar designs of camera could be provided with carrying cases according to the principles set forth.

The exemplary make and model camera for which this invention provides a novel, safe and extremely useful carrying case is the Model SX-70 manufactured by the Polaroid Corporation, Cambridge, Mass. All SX-70 cameras sold to date of filing of this Application are effectively identical insofar as the carrying case problem is concerned.

The inventor of the carrying case described below made the invention as a result of difficulties encountered in using his first Model SX-70 Polaroid camera. The camera itself has no handle and when closed has a smooth contour. It cannot be opened for operation in the carrying case sold by the manufacturer. On removal from the manufacturer's case, the camera is for convenience usually held in one hand or laid aside while the case is temporarily stored in a pocket or the like. Reloading in the field with no clean, dry supporting surface available is practically a "three handed" operation, with the filmpack grasped at the ready concurrently with two-handed manipulation of the camera. Photographs emerge at the lower front of the camera and removal occupies both the user's hands.

The first Model SX-70 purchased by the inventor was damaged beyond repair when it accidentally slipped from an automobile roof during preparations for photographing, and an important object of the invention is to prevent this type accident from happening when using such cameras by protecting them and making them easier to hold.

Other objects of this invention are to provide a carrying case of the type described which makes the use of cameras such as the Polaroid Model SX-70 more a relaxed operation, faster, and considerably more economical in the long run, which permits all operations of the camera except loading while in the case, and which compactly carries a flash bar and extra film.

Further objects are to provide a camera carrying case of the type described which is easy, natural and convenient to use, simple, durable, failsafe, attractive in appearance, and economical to manufacture and purchase.

In brief summary given for purposes of exposition only, the invention includes in one embodiment a strap-hung case with a hinged cover, having a forward aperture and a lower yielding portion for film ejection, and structure for gripping a camera disposed with the case in both open and closed camera positions.

Other objects and advantages of this invention will become more readily apparent on examination of the following description, including the drawings, in which, like parts being indicated by like reference numerals:

FIG. 1 is an isometric view of the invention in use;

FIG. 2 is an isometric detail view taken at 2—2, FIG. 1;

FIG. 3 is an isometric view of the invention in camera-storage position;

FIG. 4 is a plan view;

FIG. 5 is a side elevational view;

FIG. 6 is a front elevational view;

FIG. 7 is a sectional view taken at 7—7, FIG. 4;

FIG. 8 is a sectional detail adapted from 8—8, FIG. 1; and

FIG. 9 is a side elevational view of a further embodiment of the invention.

Referring now to the FIGS. in detail, FIG. 1 shows the camera case 10 of this invention in use with a Polaroid Land SX-70 Camera C (phantom lines) opened and ready for photographing.

The carrying case consists generally of a relatively rigid case body 12 having a hinged cover 14 with a snap half 16 for securing the cover in the closed position in conjunction with a mating snap half 16' not shown, on the bottom 18 of the case body. Across the open front of the case body a camera-retaining transverse bar 20 is fixed to the sides 22, 24 of the case body, leaving a transverse slot 26 below the transverse bar for ejection of film F from the rearwardly adjacent picture-ejection opening in the camera front, after self development of film in the SX70 type camera.

The Polaroid Land SX-70 camera or any similar-design camera fits in the open upper portion of the case where it is held securely at the rear in a socket formed by the rear 28 and a short permanently fixed section of top 30 joining the sides and rear of the case. The sides are made to spring inward slightly by means to be described, gripping the sides of the camera base.

Strap 32 is a loop with a substantial length 34 of the ends cemented, sewn, riveted, or otherwise fixed to the respective sides of the case body parallel with the sides, causing the loop to run forwardly from the front of the case body. In the event the case with an open camera contained in it slips from the horizontal operative position shown, the strap pulls the front of the camera upward pivoting the rear of the camera downward so that the falling camera is arrested by the case body socket, with the exposed upper parts of the camera protected between the case body and the user's torso.

FIGS. 2 and 3 in addition to FIG. 1 illustrate a further feature of the carrying case which helps maintain the balance of the camera, provides cushioning below it if accidently dropped, and provides conveniently located, convenient to use, compact storage. The case cover 14 is secured to the lower rear edge of the case body by double hinge assembly 36 or is equivalently secured for 270° pivot with respect to the case body. Spacing between the two hinge axes is equal to the height of the case body. A relatively flexible terminal portion 38 of the cover wraps around the front of the camera as a closure secured by the snap halves when the camera is collapsed in storage configuration. The inner face of the cover is concave, providing clearance for housing the camera viewfinder.

An internal partition 40 defines a compartment 42 in the upper portion of the cover parallel with the plane of the cover, which provides storage of one filmpack and at least one "Flashbar" B, both these items being separately supplied by the manufacturer for use with the Polaroid Land SX-70 camera. "Flashbar" is a trademark of the General Electric Company and "Polaroid" is a registered trademark of the Polaroid Corporation.

The compartment terminates with a flexible closure portion 44 at the end having a snap securance 46.

Access to and removal of the contents of the enclosure is straightforward and easy both with the cover in place over the camera and with it in the hanging position. The snap is opened and the "Flashbar" and film-pack fall freely into the hand.

If the open camera and case are dropped while on the neckstrap but over a table, wall or other obstacle above which there is insufficient clearance, the downward extending cover is in position to strike first, cushioning the impact.

A further feature of the carrying case is a standard tripod screw thread attachment 48 in the bottom. The cover when open in no way interferes with tripod mounting and operation being spaced rearwardly half the length of the camera from the attachment point and being hinged to flexfree of the tripod.

FIGS. 4 through 6 show in plan, side elevation and front view structural features of the carrying case, particularly the stiffening structure which consists of a half-hard temper .016 aluminum sheet or other lightweight resilient sheet sandwiched between leather sheathing. The case body 12 has a stiffener in the form of a rectangular box frame 50 having full width upper and lower openings 52 (FIG. 6) and 54 (FIG. 4) respectively.

The upper opening extends from the front to a point adjacent the rear about ⅝ inch forward of the rear, providing room for the camera to fit into the carrying case with the rear inserted in the socket and the top of the camera free to hinge up forward of the socket when deployed for photographing. The upper opening extends downward narrowing transverse bar 20 at the front for camera-insertion clearance. The lower opening extends from the filmslot rearward about one-third the length of the camera. The sides provide flexible grip on the camera, particularly lateral of the lower opening where they are free of cross-structure. The tripod attachment preferably is welded to the sheetmetal structure. Leather sandwiches and cushions the cover and case body stiffeners throughout.

A resilient pad 56 in the rear of the case body or "socket" assures a snug, secure fit of the camera in the foreand-aft direction. A window 58 provides a view of the frame counter, and a hole 60 in the hinge assembly gives visual access to the window when the case is closed.

FIG. 7, a section, shows that in the preferred embodiment the case body leather at 62 continues relatively loosely over the lower opening, ending at the film exit slot.

FIG. 8 shows the reason for this. The leather safely covers the bottom opening or discontinuity at all times, while flexing and permitting the bottom of the SX70 camera to hinge downward about the transverse hinge point located about one-third way back in the camera as required for print ejection. It is apparent that the friction retention of the open camera forward portion by the carrying case in any event is less likely to jam the film ejection operation than if the retention were of a more positive type, since it is easier for the camera to slip itself upward in the friction-fit under drive of the ejection mechanism.

FIG. 9 shows an alternative embodiment 900 in which the wraparound terminal portion 938 of the cover is lengthened and the lower opening 954 is entirely exposed when the camera is in use. This embodiment makes the camera somewhat easier to remove from the carrying case by providing better access for gripping, but provides less protection during operation.

It will be seen also that both fasteners 916 and 946 are conveniently at the same general end and may be similar in operation without confusion since they face in opposite directions relative to the carrying case as a whole.

Obviously many modifications and variations of the present invention are possible in light of the above teachings. It is, therefore, to be understood that within the scope of the appended claims the invention may be practiced otherwise than as specifically described.

What is desired to be secured and obtained by U.S. Letters Patent is:

1. A camera carrying case comprising a substantially rigid rectangular case body with front, rear, bottom, top and sides, the top having an opening therein for receiving a camera and rearwardly forming with the sides, bottom and rear a socket for retaining self-developing type camera received in said opening, the front comprising a transverse bar connecting the sides, with an opening therebelow located for registration with the picture ejection opening of a self-developing type camera when carried in said case and the upper portion of the transverse bar bounded by the top opening, the bottom having a discontinuous portion forwardly therein comprising a full width yielding portion extending rearwardly along a substantial portion of the length of the case body for permitting downward motion of a portion of a said self-developing type camera during operation thereof, a cover proportioned for covering all said openings, and means for hinging the cover to the case body at the rear.

2. A camera carrying case comprising a substantially rigid rectangular case body with front, rear, bottom, top and sides, the top having an opening therein for receiving a camera and rearwardly forming with the sides, bottom and rear a socket for retaining a camera received in said opening, the front comprising a transverse bar connecting the sides, with an opening therebelow and the upper portion thereof bounded by the top opening, the bottom having a discontinuous portion forwardly therein, a cover proportioned for covering all said openings, and means for hinging the cover to the case body at the rear, the means for hinging the cover being attached at the lower edge of the rear and comprising a double hinge with the spacing between the axes of the double hinge being substantially the thickness dimension of the case body.

3. A camera carrying case as recited in claim 2, the portion of the double hinge in the spacing between the axes thereof having an aperture therethrough.

4. A camera carrying case as recited in claim 1, the sides including means for gripping a said self-developing type camera adjacent said discontinuous portion of the bottom.

5. A camera carrying case comprising a substantially rigid rectangular case body with front, rear, bottom, top and sides, the top having an opening therein for receiving a camera and rearwardly forming with the sides, bottom and rear a socket for retaining a camera received in said opening, the front comprising a transverse bar connecting the sides, with an opening therebelow and the upper portion thereof bounded by the top opening, the bottom having a discontinuous portion forwardly therein, a cover proportioned for covering all said openings, means for hinging the cover to the case body at the rear, a sheetmetal box-like frame providing a portion of said substantial rigidity of said case body, and a relatively softer covering over both surfaces of all portions of the sheetmetal box-like frame.

6. A camera carrying case comprising a substantially rigid rectangular case body with front, rear, bottom, top and sides, the top having an opening therein for receiving a camera and rearwardly forming with the sides, bottom and rear a socket for retaining a camera received in said opening, the front comprising a transverse bar connecting the sides, with an opening therebelow, and the upper portion thereof bounded by the top opening, the bottom having a discontinuous portion forwardly therein, a cover proportioned for covering all said openings, the cover having an enclosure on the exterior surface thereof proportioned for containing at least a filmpack for use with said camera, and means for hinging the cover attached at the lower edge of the rear, comprising a double hinge with the spacing between the axes of the double hinge being substantially the thickness dimension of the case body.

7. A camera carrying case as recited in claim 6, the portion of the double hinge in the spacing between the axes thereof having an aperture therethrough.

8. A camera carrying case comprising a substantially rigid rectangular case body with front, rear, bottom, top and sides, the top having an opening therein for receiving a camera and rearwardly forming with the sides, bottom and rear a socket for retaining a camera received in said opening, the front comprising a transverse bar connecting the sides, with an opening therebelow and the upper portion thereof bounded by the top opening, the bottom having a discontinuous portion forwardly therein, a cover proportioned for covering all said openings, means for hinging the cover to the case body at the rear, the cover having an enclosure on the exterior surface thereof proportioned for containing at least a filmpack for use with said camera, the enclosure having a pivotal cover at one end opposite the end of the camera case having the means for hinging, means for securing said pivotal cover in closed position on top of said enclosure, and means on the cover at the end opposite the means for hinging, for fastening the cover to the bottom of the case body, the fastening means including a pivotal portion of the cover and the pivoting thereof for fastening being in the opposite direction from the pivoting of said pivotal cover over said enclosure.

* * * * *